(12) United States Patent
Nishimura et al.

(10) Patent No.: US 7,854,880 B2
(45) Date of Patent: Dec. 21, 2010

(54) POLYLACTIC ACID MOLDING AND PROCESS FOR PRODUCING THE SAME

(75) Inventors: Hiroshi Nishimura, Kyoto (JP); Masanobu Hioki, Kyoto (JP)

(73) Assignee: Unitika Ltd., Hyogo (JP)

( * ) Notice: Subject to any disclaimer, the term of this patent is extended or adjusted under 35 U.S.C. 154(b) by 328 days.

(21) Appl. No.: 10/505,311

(22) PCT Filed: Mar. 5, 2003

(86) PCT No.: PCT/JP03/02607

§ 371 (c)(1),
(2), (4) Date: Aug. 20, 2004

(87) PCT Pub. No.: WO03/074593

PCT Pub. Date: Sep. 12, 2003

(65) Prior Publication Data

US 2005/0165142 A1    Jul. 28, 2005

(30) Foreign Application Priority Data

Mar. 6, 2002   (JP)   .............................. 2002-059603

(51) Int. Cl.
B29C 51/00 (2006.01)
C08K 3/34 (2006.01)

(52) U.S. Cl. .................. 264/544; 524/451; 524/539

(58) Field of Classification Search .............. 524/451, 524/502, 210, 539; 525/437; 264/544
See application file for complete search history.

(56) References Cited

U.S. PATENT DOCUMENTS

| | | | | |
|---|---|---|---|---|
| 5,766,748 A | * | 6/1998 | Ikado et al. .................. 428/220 |
| 5,883,199 A | * | 3/1999 | McCarthy et al. ........... 525/437 |
| 5,916,950 A | * | 6/1999 | Obuchi et al. ............... 524/492 |
| 6,153,276 A | * | 11/2000 | Oya et al. .................... 428/35.2 |
| 6,235,825 B1 | * | 5/2001 | Yoshida et al. .............. 524/314 |
| 6,326,440 B1 | * | 12/2001 | Terada et al. ................ 525/411 |
| 6,573,340 B1 | * | 6/2003 | Khemani et al. ............. 525/437 |
| 6,787,613 B2 | * | 9/2004 | Bastioli et al. .............. 525/411 |
| 7,235,287 B2 | * | 6/2007 | Egawa ......................... 428/212 |
| 2006/0148969 A1 | * | 7/2006 | Tanaka et al. ................ 524/502 |

FOREIGN PATENT DOCUMENTS

| | | |
|---|---|---|
| EP | 585747 | 3/1994 |
| EP | 0776927 | 6/1997 |
| EP | 780428 | 6/1997 |
| EP | 0821036 | 1/1998 |
| EP | 1033383 | 9/2000 |
| JP | 06-023828 | 2/1994 |
| JP | 8-73628 | 3/1996 |
| JP | 08-193165 | 7/1996 |
| JP | 09-012748 | 1/1997 |
| JP | 9-25345 | 1/1997 |
| JP | 09-157408 | 6/1997 |
| JP | 10-36651 | 2/1998 |
| JP | 10-087976 | 4/1998 |
| JP | 10-120887 | 5/1998 |
| JP | 11-124495 | 5/1999 |
| JP | 2000-273207 | 10/2000 |
| JP | 2002-146170 | 5/2002 |
| JP | 2003-012834 | 1/2003 |
| JP | 2003-068387 | * 12/2003 |
| JP | 2004-099703 | 4/2004 |
| JP | 2004-538178 | 12/2004 |
| WO | 03/016015 | 2/2003 |

* cited by examiner

Primary Examiner—Vickey Nerangis
(74) Attorney, Agent, or Firm—Fildes & Outland, P.C.

(57) ABSTRACT

A polylactic acid formed article and a production process therefor. A resin composition for the formed article comprises polylactic acid having an optical purity of not lower than 90% and a residual lactide amount of 0.1 to 0.6% by mass, and 1 to 25% by mass of a crystal nucleus agent. The formed article is characterized in that a difference ($|\Delta Hm|-|\Delta Hc|$) between the absolute value of a crystal fusion heat amount $\Delta Hm$ as measured at a heat-up rate of 20° C./min by means of a differential scanning calorimeter and the absolute value of a heat-up crystallization heat amount $\Delta Hc$ generated by heat-up crystallization is not lower than 25 J/g, and has a crystallinity of not lower than 35% as determined by X-ray measurement and a crystallization speed of not lower than 0.05 $\text{min}^{-1}$ at 130° C.

1 Claim, No Drawings

POLYLACTIC ACID MOLDING AND PROCESS FOR PRODUCING THE SAME

TECHNICAL FIELD

The present invention relates to a polylactic acid formed article and a process for producing the same.

BACKGROUND ART

With a recent increasing social demand for environmental conservation, biodegradable polymers which are decomposed by microorganism have attracted attention. Specific examples of the biodegradable polymers include fusion-moldable polyesters including aliphatic polyesters such as polybutylene succinate, polycaprolactone and polylactic acid, and aliphatic/aromatic copolymer polyesters such as terephthalic acid/1,4-butanediol/adipic acid copolymers. Among these aliphatic polyesters, the polylactic acid, which is widely distributed in nature and is harmless to animals, plants and humans, is highly heat-resistant with a melting point of 140 to 175° C. The polylactic acid is promising as a less expensive thermoplastic biodegradable resin.

Where the polylactic acid is molded or formed into a sheet or a container, however, crystals of the polylactic acid are generally completely fused due to thermal history experienced during the molding or the forming, so that the resulting molded or formed article is poor in heat resistance.

Many attempts to impart the polylactic acid with heat resistance have been reported. For example, JP-A-8-193165 proposes a method for producing a molded article by injection-molding, blow-molding or compression-molding a polylactic acid polymer to which talc, silica or calcium lactate is added as a crystal nucleus agent. However, this method is problematic in that the crystallization of the polymer is insufficient without a heat treatment and the productivity is low with a lower crystallization speed of the polymer. Further, JP-A-4-220456 proposes a method in which polyglycolic acid and its derivative are added as a crystal nucleus agent to poly-L-lactide to increase the crystallization speed for reduction of an injection molding cycle time and to improve the mechanical characteristics of the resulting molded article.

However, JP-A-8-193165 states that an attempt was made to produce a molded article by the injection molding by the method stated in JP-A-4-220456 but failed at a mold temperature of not lower than Tg as disclosed in JP-A-4-220456.

JP-A-11-106628 discloses a method in which wax is employed as a crystal nucleus agent and a crystallization promoter, and a molded article is heat-treated at a crystallization temperature or kept in a mold set at the crystallization temperature for a predetermined period. However, the wax employed as the crystal nucleus agent is generally less compatible with the polylactic acid thereby to be bled out. Therefore, only a small amount of the wax is added, which is insufficient for formation of crystal nuclei.

JP-A-9-25345 discloses a method for imparting heat resistance and shock resistance without the use of a crystal nucleus agent, wherein an unstretched sheet is stretched 1.5 to 5 times for improvement of the crystal orientation and crystallinity of the sheet. However, the sheet produced by this method is a stretched sheet, which is further stretched when subjected to a forming process to provide a formed article. Unfortunately, the sheet once stretched is inferior in drawability and, therefore, is not suitable for deep drawing. The applications of the sheet are inevitably limited.

DISCLOSURE OF THE INVENTION

To solve the aforesaid problems, it is an object of the present invention to provide a polylactic acid formed article which is excellent in heat resistance and shock resistance and can be produced at a higher productivity by a forming process.

According to a first aspect of the present invention to achieve this object, there is provide a polylactic acid article formed from a sheet of a resin composition comprising polylactic acid as a major resin component and a crystal nucleus agent, the polylactic acid having an optical purity of not lower than 90% and a residual lactide amount of 0.1 to 0.6% by mass, the crystal nucleus agent being present in a proportion of 1 to 25% by mass in the resin composition, the formed article being characterized in that a difference ($|\Delta Hm|-|\Delta Hc|$) between the absolute value of a crystal fusion heat amount $\Delta Hm$ as measured at a heat-up rate of 20° C./min by means of a differential scanning calorimeter and the absolute value of a heat-up crystallization heat amount $\Delta Hc$ generated by heat-up crystallization is not lower than 25 J/g, the formed article having a crystallinity of not lower than 35% as determined by X-ray measurement and a crystallization speed of not lower than 0.05 $min^{-1}$ at 130° C.

Although the polylactic acid is known as a material having a very low crystallization speed, the crystallinity (crystallization speed) of the polylactic acid per se is increased by limiting the optical purity and residual lactide amount of the polylactic acid as described above. Further, the crystallinity of the polylactic acid after the forming is increased by the addition of a proper amount of the crystal nucleus agent. Thus, the formed article has an excellent heat resistance.

According to the present invention, the crystal nucleus agent is preferably talc having an average particle diameter of 0.1 to 10 µm.

According to the present invention, the resin composition preferably further comprises a dispersant for the crystal nucleus agent, and the dispersant preferably comprises an aliphatic amide.

The aliphatic amide preferably comprises at least one of erucamide, stearamide, oleamide, ethylene-bis-stearamide, ethylene-bis-oleamide and ethylene-bis-laurylamide.

The inventive polylactic acid formed article is preferably formed by one of vacuum forming, air pressure forming, vacuum air pressure forming and press forming.

A first production process for the polylactic acid article formed from the sheet of the resin composition comprising the polylactic acid as the major resin component and the crystal nucleus agent according to the first inventive aspect comprises the steps of: extruding the resin composition into a sheet, the polylactic acid in the resin composition having an optical purity of not lower than 90% and a residual lactide amount of 0.1 to 0.6% by mass, the crystal nucleus agent being present in a proportion of 1 to 25% by mass in the resin composition; heat-treating the sheet at a temperature of 110 to 150° C. for 1 to 30 seconds; and forming the sheet into the article after the heat treatment.

A second production process for the polylactic acid article formed from the sheet of the resin composition comprising the polylactic acid as the major resin component and the crystal nucleus agent according to the first inventive aspect comprises the steps of: extruding the resin composition into a sheet, the polylactic acid in the resin composition having an optical purity of not lower than 90% and a residual lactide amount of 0.1 to 0.6% by mass, the crystal nucleus agent being present in a proportion of 1 to 25% by mass in the resin composition; and forming the sheet into the article while heat-treating the sheet at a temperature of 110 to 150° C. for 1 to 30 seconds.

According to the present invention, one of vacuum forming, air pressure forming, vacuum air pressure forming and press forming is preferably employed for the forming.

The polylactic acid formed article according to the first inventive aspect is formed from the sheet comprising the crystal nucleus agent blended in the specified amount in the specified polylactic acid, so that the crystallization speed of the resin composition is promoted. The formed article has an excellent heat resistance such that the difference (|ΔHm|−|ΔHc|) between the absolute value of the crystal fusion heat amount ΔHm measured at a heat-up rate of 20° C./min by means of the differential scanning calorimeter and the absolute value of the heat-up crystallization heat amount ΔHc generated by heat-up crystallization is not lower than 25 J/g, the crystallinity determined by X-ray measurement is not lower than 35%, and the crystallization speed is not lower than 0.05 $min^{-1}$ at 130° C.

In the production processes for the polylactic acid formed article according to the first inventive aspect, the resin composition comprising the specified polylactic acid and the specified amount of the crystal nucleus agent is formed into the sheet, and the sheet is heat-treated under the specified conditions prior to or simultaneously with the sheet forming. Thus, the polylactic acid formed article according to the present invention can easily be produced.

The polylactic acid formed article is advantageously applicable to containers required to have a heat resistance, for example, tableware such lunch trays, bowls, dishes and cups. Since the polylactic acid formed article is free from deformation during storage or transportation thereof in summer, the polylactic acid formed article has a variety of applications for lid materials, building materials, boards, stationery, cases, carrier tapes, cards such as prepaid cards and IC cards, FRPs and various containers. Since the polylactic acid formed article is mainly composed of the biodegradable polylactic acid, the polylactic acid formed article is not accumulated in a natural environment even if being discarded after use. This makes it possible to alleviate an environmental burden to the natural environment and wild animals.

According to a second aspect of the present invention, there is provided a polylactic acid article formed from a sheet of a resin composition comprising polylactic acid as a major resin component, the resin composition comprising a crystalline polylactic acid resin (A) having an optical purity of not lower than 95%, an aromatic/aliphatic copolymer polyester or an aliphatic polyester (B) having a glass transition temperature of not higher than 0° C., and talc (C) having an average particle diameter of 1 to 8 μm with an (A)/(B) blend ratio of (A)/(B)=97/3 to 80/20% by mass and with a (C) blend ratio of 1 to 30% by mass based on the total amount of the composition, the formed article having a crystallization index such that a difference between the absolute value of a crystal fusion heat amount ΔHm as measured at a heat-up rate of 20° C./min by means of a differential scanning calorimeter and the absolute value of a heat-up crystallization heat amount ΔHc is (|ΔHm|−|ΔHc|)≧25 J/g, a crystallization speed of not lower than 0.010 $min^{-1}$ at 130° C., and a falling ball impact resistance such that a falling ball height is not smaller than 20 cm with respect to a thickness of 500 μm.

The inventive polylactic acid formed article is preferably formed by one of vacuum forming, air pressure forming, vacuum air pressure forming and press forming of the sheet.

A production process for the polylactic acid article formed from the sheet of the resin composition comprising the polylactic acid as the major resin component according to the second inventive aspect comprises the steps of: extruding the resin composition into a sheet, the resin composition comprising the crystalline polylactic acid resin (A) having an optical purity of not lower than 95%, the aromatic/aliphatic copolymer polyester or the aliphatic polyester (B) having a glass transition temperature of not higher than 0° C., and the talc (C) having an average particle diameter of 1 to 8 μm with an (A)/(B) blend ratio of (A)/(B)=97/3 to 80/20% by mass and with a (C) blend ratio of 1 to 30% by mass based on the total amount of the composition; heat-treating the sheet at a treatment temperature of 110 to 150° C. for a treatment period of 1 to 30 seconds and forming the sheet into the article.

According to the present invention, it is preferred to form the sheet by one of vacuum forming, air pressure forming, vacuum air pressure forming and press forming after heat-treating the sheet.

According to the present invention, it is preferred to form the sheet by one of vacuum forming, air pressure forming, vacuum air pressure forming and press forming while heat-treating the sheet in a die.

The polylactic acid formed article according to the second inventive aspect is produced by preparing the sheet by mixing the polylactic acid having a strictly adjusted optical purity, the aromatic/aliphatic polyester or the aliphatic polyester having a glass transition temperature of not higher than 0° C. and the talc in the specified blend ratio, forming the sheet into the article by a common forming process typified by the vacuum forming, and heat-treating the sheet under the specified conditions prior to the forming or heat-treating the sheet in the die under the predetermined conditions during the forming. The resulting biodegradable article has thermal properties such that (|ΔHm|−|ΔHc|)≧25 J/g, the crystallization speed is not lower than 0.010 $min^{-1}$, and the falling ball height is not smaller than 20 cm with respect to a thickness of 500 μm. Thus, the polylactic acid formed article has a shock resistance and a heat resistance sufficient to withstand hot water, which cannot be realized in the case of the conventional polylactic acid formed article.

The inventive polylactic acid formed article is applicable to containers such as lunch trays, bowls, dishes and cups which are required to have heat resistance and shock resistance. Since the polylactic acid formed article is free from deformation during storage and transportation thereof in summer, the formed article has a variety of applications for lid materials, building materials, boards, stationery, cases, carrier tapes, cards such as prepaid cards and IC cards and FRPs.

DETAILED DESCRIPTION OF THE INVENTION

The polylactic acid formed article according to the first inventive aspect should be formed from a sheet of a resin composition comprising a specified polylactic acid as a major resin component and a specified proportion of a crystal nucleus agent.

The polylactic acid formed article according to the second inventive aspect should be formed from a sheet of a resin composition comprising a specified polylactic acid, a specified proportion of a specified aliphatic/aromatic polyester or a specified aliphatic polyester, and a specified proportion of a crystal nucleus agent.

A crystalline polylactic acid resin to be employed in the present invention should have an optical purity of not lower than 90% (first aspect) or not lower than 95% (second aspect).

There are two types of monomers of the polylactic acid having different optical activities, i.e., D-lactic acid and L-lactic acid. Currently, L-lactic acid is industrially mass-produced at lower costs, and poly-L-lactic acid (PLLA) derived from L-lactic acid is commonly used. The crystallinity of the polylactic acid varies depending on the content of L-lactic acid or D-lactic acid. Where the optical purity L of the lactic acid monomers is defined by the following expression (1) for example, the crystallinity is increased as L (i.e., the optical purity) increases.

$$\text{Optical purity} = |M(L) - M(D)| \quad (1)$$

wherein M(L) is the mole percentage of L-lactic acid units with respect to the total lactic acid units constituting the polylactic acid resin, M(D) is the mole percentage of D-lactic acid units with respect to the total lactic acid units constituting the polylactic acid resin, and $M(L)+M(D)=100$.

More specifically, an optical purity of not lower than 90% according to the first aspect is equivalent to, for example, a D-isomer content of not higher than 5 mol % in the polylactic acid. Examples of the polylactic acid include poly-L-lactic acid, poly-DL-lactic acid which is a copolymer of L-lactic acid and D-lactic acid, and a mixture of the poly-L-lactic acid and the poly-DL-lactic acid.

In general, even where the PLLA is prepared, for example, by polymerizing 100% L-lactic acid monomers thereby to have an optical purity of 100%, some of the monomers are racemized by thermal history experienced during the polymerization or the subsequent fusion molding. Industrially available PLLA supposedly has an optical purity of about 98% at the highest. Hence, this PLLA practically has the highest possible crystallinity among the polylactic acids. However, even such PLLA comprising the L-lactic acid monomers with a high purity has a relatively low crystallization speed and, therefore, is highly liable to be supercooled during a cooling crystallization process.

In order to impart the finally obtained polylactic acid article with heat resistance, it is necessary to promote the crystallization (crystallization speed) of the polylactic acid per se, and to improve the crystallinity of the polylactic acid after the forming. Therefore, the polylactic acid per se should be able to crystallize to a high crystallinity. Hence, the polylactic acid resin according to the first inventive aspect should have an optical purity of not lower than 90%, preferably not lower than 96%. Further, the polylactic acid resin according to the second inventive aspect should have an optical purity of not lower than 95%, preferably not lower than 96%. If the optical purity of the polylactic acid resin is lower than 90% (first aspect) or lower than 95% (second aspect), the polylactic acid per se has a reduced crystallinity. Even if talc is added as the crystal nucleus agent or the heat treatment is performed, the polylactic acid is not sufficiently crystallized, failing to have a desired heat resistance.

Particularly for practical strength and durability, a polymer to be employed as the polylactic acid preferably has a relatively high molecular weight, typically a weight-average molecular weight of not smaller than 100,000, preferably 150,000 to 300,000, more preferably 160,000 to 200,000. If the weight-average molecular weight of the polylactic acid is smaller than 150,000, the melt viscosity is too low, so that the resulting sheet is poor in mechanical characteristics. If the weight-average molecular weight is greater than 300,000, the melt viscosity is too high, resulting in difficulty in fusion extrusion.

It is generally known that, if an excessively great amount of lactide is present in the polylactic acid resin, the hydrolysis of the polylactic acid is promoted. However, the lactide which has a lower molecular weight is more easily crystallized than the polylactic acid which has a higher molecular weight. Therefore, the crystallization of the lactide triggers and promotes the crystallization of the polylactic acid. Hence, proper setting of the amount of the lactide present in the polylactic acid is effective for the promotion of the crystallization and the impartation of the heat resistance. That is, the residual lactide amount should be 0.1 to 0.6% by mass, preferably 0.1 to 0.4% by mass, based on the total amount of the resin according to the first inventive aspect. According to the second inventive aspect, the residual lactide amount should be 0.1 to 0.6% by mass, preferably 0.1 to 0.4% by mass, based on the total amount of the resin. A residual lactide amount of smaller than 0.1% by mass is excessively low and, hence, insufficient for triggering and promoting the crystallization of the polylactic acid. If the residual lactide amount is greater than 0.6% by mass, the hydrolysis is more liable to be promoted.

According to the second inventive aspect, the aromatic/aliphatic copolymer polyester or the aliphatic polyester having a glass transition temperature of not higher than 0° C. is essentially employed as a component for drastic improvement of the shock resistance as well as the heat resistance of the polylactic acid formed article.

The aromatic/aliphatic copolymer polyester or the aliphatic polyester has a glass transition temperature of not higher than 0° C. and, hence, has flexibility at an ordinary temperature. This component is dispersed in the polylactic acid resin, serving to absorb an external shock as in a case where a rubber is dispersed. This contributes to the improvement of the shock resistance. Specific examples of this component include an aromatic/aliphatic copolymer polyester comprising at least an aliphatic dicarboxylic acid, an aromatic dicarboxylic acid and an aliphatic diol as constituents, an aliphatic polyester comprising at least an aliphatic dicarboxylic acid and an aliphatic diol, and an aliphatic polyester obtained by ring opening polymerization of ε-caprolactone as a cyclic monomer.

Examples of the aliphatic dicarboxylic acid include succinic acid, adipic acid, suberic acid, sebacic acid and dodecanoic diacid. Examples of the aromatic dicarboxylic acid include terephthalic acid, isophthalic acid and naphthalene dicarboxylic acid. Examples of the aliphatic diol include ethylene glycol, propylene glycol, 1,4-butanediol and 1,4-cyclohexanedimethanol. The component (B) is obtained by polycondensation of at least one of the aforesaid components. As required, the component (B) is allowed to have a so-called jump-up structure and a long chain branch by employing an isocyanate, an acid anhydride, an epoxy compound, an organic peroxide or the like.

In the second inventive aspect, where the crystalline polylactic acid resin having an optical purity of not lower than 95% is defined as the component (A) and the aromatic/aliphatic copolymer polyester or the aliphatic polyester having a glass transition temperature of not higher than 0° C. is defined as the component (B), the blend ratio of the component (A) and the component (B) should be (A)/(B)=97/3 to 80/20% by mass, preferably (A)/(B)=97/3 to 85/15, more preferably (A)/(B)=95/5 to 85/15% by mass. If the blend ratio of the component (B) is smaller than 3% by mass, the external shock cannot be absorbed, resulting in a lower shock resistance. On the other hand, if the blend ratio of the component (B) is greater than 20% by mass, the shock resistance is remarkably improved. However, the crystallization of the polylactic acid per se is hindered, resulting in a lower heat resistance. In addition, the crystallization speed is reduced, so that the production requires a prolonged forming cycle time to reduce the productivity.

In the first inventive aspect, the resin composition may further comprise another resin component such as an aliphatic polyester, an aliphatic/aromatic copolymer polyester or a polyester carbonate, as far as the properties of the polylactic acid are not deteriorated.

In the first inventive aspect, the crystal nucleus agent should be contained in an amount of 1 to 25% by mass in the resin composition. If the amount of the crystal nucleus agent is smaller than 1% by mass, the effect of the crystal nucleus agent is insufficient. If the amount of the crystal nucleus agent is greater than 25% by mass, the excessively great amount of the crystal nucleus agent adversely influences the properties of the resin composition, for example, the resulting formed article is embrittled. Therefore, the amount of the crystal nucleus agent in the resin composition is preferably in a range of 1 to 20% by mass, more preferably 1 to 15% by mass.

The crystal nucleus agent preferably has an average particle diameter of 0.1 to 10 µm. If the average particle diameter is smaller than 0.1 µm, the effect of the crystal nucleus agent is insufficient with insufficient dispersion and secondary coagulation. If the average particle diameter is greater than 10 µm, the properties of the sheet are adversely influenced, so that the properties of the formed article are adversely influenced.

The crystal nucleus agent is not particularly limited, but examples of the crystal nucleus agent include laminar silicates typified by talc, smectite, vermiculite and swellable fluorine-containing mica, among which the talc is preferably used as the crystal nucleus agent because it is an inorganic substance having the highest crystallization efficiency for the polylactic acid. Further, the talc is preferred because it is a very cheap and naturally existing inorganic substance which is industrially advantageous and imposes no burden to the global environment.

In the second aspect of the present invention, it is essential to optimize the polylactic acid resin per se as described above and to blend the talc as the crystal nucleus agent for the promotion of the crystallization.

The talc as the crystal nucleus agent in the second inventive aspect has an average particle diameter of 1 to 8 µm, preferably 1 to 5 µm. Among the various crystal nucleus agents, the talc which is an inorganic substance having the highest crystallization efficiency for the polylactic acid is the most preferred crystal nucleus agent. Further, the talc is industrially advantageous and imposes no burden to the natural environment, because it is a very cheep and naturally existing inorganic substance. If the average particle diameter of the talc is smaller than 1 µm, the effect of the crystal nucleus agent is insufficient with insufficient dispersion and secondary coagulation. Therefore, the resulting formed article has an insufficient heat resistance. If the average particle diameter is greater than 8 µm, the talc serving as the crystal nucleus agent causes defect in the formed article, thereby adversely influencing the properties and surface state of the formed article.

The content of the talc is 1 to 30% by mass, preferably 5 to 20% by mass, more preferably 10 to 15% by mass, based on the total amount of the composition. A content of smaller than 1% by mass is excessively low and, therefore, only a small amount of crystal nuclei are generated, so that the effect of the crystal nucleus agent is insufficient. Hence, the resulting formed article has an insufficient heat resistance. A content of greater than 30% by mass is excessively high, so that the properties of the resulting formed article is adversely influenced, for example, the formed article is embrittled.

A dispersant may be employed for efficiently dispersing the crystal nucleus agent in the resin composition for the sheet. The dispersant is preferably highly compatible with the polylactic acid and has an excellent wettability with respect to the crystal nucleus agent. It is important to select at least one of aliphatic amides including erucamide, stearamide, oleamide, ethylene-bis-stearamide, ethylene-bis-oleamide and ethylene-bis-laurylamide as the dispersant for efficiently increasing the crystallinity of the polylactic acid formed article.

In the present invention, a cross-linking agent such as an organic peroxide and an auxiliary cross-linking agent may be employed in combination as required for lightly cross-linking the resin composition for the acceleration of the crystallization speed by the crystal nucleus agent.

Specific examples of the cross-linking agent include: organic peroxides such as n-butyl-4,4-bis-t-butyl peroxyvalerate, dicumyl peroxide, di-t-butyl peroxide, di-t-hexyl peroxide, 2,5-dimethyl-2,5-di(t-butylperoxy)hexane and 2,5-dimethyl-2,5-t-butylperoxyhexyne-3; polycarboxylic acids such as phthalic anhydride, maleic anhydride, trimethyl adipate, trimellitic anhydride and 1,2,3,4-butanetetracarboxylic acid; metal complexes such as lithium formate, sodium methoxide, potassium propionate and magnesium ethoxide; epoxy compounds such as bisphenol-A diglycidyl ether, 1,6-hexanediol diglycidyl ether, trimethylolpropane triglycidyl ether and diglycidyl terephthalate; and isocyanate compounds such as diisocyanates, triisocyanates, hexamethylene diisocyanate, 2,4-tolylene diisocyanate, 2,6-tolylene diisocyanate, xylylene diisocyanate and diphenylmethane diisocyanate.

Examples of the auxiliary cross-linking agent include trimethacrylates, glycidyl methacrylate, n-butyl methacrylate, hydroxypropyl monomethacrylate and polyethylene glycol monomethacrylate.

The polylactic acid formed article according to the first inventive aspect should be formed from the sheet of the resin composition comprising the specified polylactic acid as the major resin component and the specified proportion of the crystal nucleus agent as described above. The polylactic acid formed article according to the second inventive aspect should be formed from the sheet of the resin composition comprising the specified proportion of the specified polylactic acid, the specified proportion of the specified aliphatic/aromatic polyester or the specified aliphatic polyester and the specified proportion of the crystal nucleus agent as described above.

The formed articles according to the inventive aspects should each have a crystallization index such that a difference between the absolute value of a crystal fusion heat amount $\Delta Hm$ as measured at a heat-up rate of 20° C./min by means of a differential scanning calorimeter and the absolute value of a heat-up crystallization heat amount $\Delta Hc$ is $(|\Delta Hm|-|\Delta Hc|) \geq 25$ J/g, preferably $(|\Delta Hm|-|\Delta Hc|) \geq 29$ J/g. To satisfy the expression $(|\Delta Hm|-|\Delta Hc|) \geq 25$ J/g, it is necessary to optimize the optical purity and the residual-lactide amount of the polylactic acid to be employed and the average particle diameter and the addition amount of the crystal nucleus agent (talc), and to perform a heat treatment to be described later.

If $(|\Delta Hm|-|\Delta Hc|) < 25$ J/g, the article is not sufficiently crystallized. When hot water (90° C.) is poured in a container formed from an ordinary polylactic acid, for example, the container is liable to be thermally deformed with an insufficient heat resistance. However, the formed article is free from such a phenomenon, if $(|\Delta Hm|-|\Delta Hc|) \geqq 25$ J/g.

The polylactic acid formed article according to the first inventive aspect should satisfy the expression $(|\Delta Hm|-|\Delta Hc|) \geqq 25$ J/g as described above, and have a crystallinity of not lower than 35% as determined by X-ray measurement and a crystallization speed of not lower than 0.05 $\min^{-1}$ at 130° C.

In order that the crystallinity determined by the X-ray measurement can be set at not lower than 35%, it is necessary to optimize the optical purity and the residual lactide amount of the polylactic acid to be employed and the average particle diameter and the addition amount of the crystal nucleus agent (talc), and to perform a heat treatment to be described later.

In order that the crystallization speed at 130° C. can be set at not lower than 0.05 $\min^{-1}$, it is necessary to employ the crystalline polylactic acid having an optical purity of not lower than 90% and a residual lactide amount of 0.1 to 0.6% by mass, to blend the crystal nucleus agent having an average particle diameter of 0.1 to 10 µm in a proportion of 1 to 30% by mass based on the total amount of the composition and prepare the sheet from the resin composition, and to heat-treat the sheet at a temperature of 110 to 150° C. for 1 to 30 seconds.

According to the first aspect, only if all the aforesaid three conditions are satisfied, the polylactic acid is supposedly crystallized to an extent sufficient to impart the formed article with the heat resistance according to the first aspect. Therefore, if at least one of the conditions is not satisfied in the first aspect, the polylactic acid is insufficiently crystallized and, hence, the resulting formed article has a lower heat resistance.

In the second inventive aspect, the heat treatment is essential in the production of the formed article. However, it is industrially impossible to perform the heat treatment for a long period of time. On the other hand, it is known that the polylactic acid has an extremely low crystallization speed. Therefore, it is necessary to impart the polylactic acid with a crystallization speed industrially suitable for the forming cycle. In the second aspect, the industrial production of the desired formed article can be achieved by precisely optimizing the composition of the polylactic acid, the crystal nucleus agent and the heat treatment conditions. The formed article according to the second aspect should have a crystallization speed of not lower than 0.010 $\min^{-1}$, preferably not lower than 0.015 $\min^{-1}$, at 130° C. A crystallization speed of lower than 0.010 $\min^{-1}$ at 130° C. is too low and unsuitable for the ordinary forming cycle, leading to insufficient crystallization and hence a lower heat resistance. In order that the crystallization speed at 130° C. can be set at not lower than 0.010 $\min^{-1}$ according to the second aspect, it is necessary to optimize the optical purity of the polylactic acid to be employed, to optimize the average particle diameter and the blend ratio of the talc, to optimize the blend ratio between the aromatic/aliphatic copolymer polyester or the aliphatic polyester and the polylactic acid, and to perform the heat treatment at a treatment temperature of 110 to 150° C. for a treatment period of 1 to 30 seconds as will be described later.

The polylactic acid formed article according to the second inventive aspect should have a falling ball impact resistance such that a falling ball height is not smaller than 20 cm with respect to a thickness of 500 µm. The falling ball height with respect to a thickness of 500 µm is herein determined by horizontally placing a box-shaped article formed from a 500 µm thick sheet with its bottom upward, and dropping a 300 g iron ball from different heights in increments of 5 cm onto the article a plurality of times, and defined as [(a height at which the article is broken at a 50% probability)−5] cm.

If the falling ball height with respect to a thickness of 500 µm is smaller than 20 cm, the formed article is liable to be broken or cracked when an external shock is applied to the formed article during transportation. Therefore, the falling ball height with respect to a thickness of 500 µm is preferably not smaller than 30 cm.

In order to impart the formed article with a falling impact resistance such that the falling ball height with respect to a thickness of 500 µm is not smaller than 20 cm, the aromatic/aliphatic copolymer polyester or the aliphatic polyester having a glass transition temperature of not higher than 0° C. should be blended in a proportion of not smaller than 3% by mass in the crystalline polylactic acid resin having an optical purity of not lower than 95%.

Next, an explanation will be given to the molecular weight retention ratio of the formed article according to the present invention. The molecular weight retention ratio is herein a percentage obtained by dividing a weight-average molecular weight (Mw) determined after a decomposition acceleration test in which the formed article is allowed to stand in a constant-temperature constant-humidity chamber under 50° C./90% RH conditions for 30 days by a weight-average molecular weight determined before the decomposition acceleration test. In general, biodegradable polylactic acid resin products (sheets and formed articles) are preferably insusceptible to decomposition during the storage or use thereof, but are decomposed speedily after use. Therefore, the molecular weight retention ratio under the aforesaid conditions of the decomposition acceleration test is preferably not lower than 60%, more preferably not lower than 70%. A molecular weight retention ratio of lower than 60% means that the decomposition speed is high and, hence, is disadvantageous in that the resulting formed article is liable to be decomposed during the storage thereof and is unsuitable for practical use.

As required, a plasticizer, a UV protective agent, a light stabilizer, an anti-hazing agent, an anti-misting agent, antistatic agent, a flame retarder, an anti-coloring agent, an antioxidant, a filler and a pigment may be added to the resin composition, as far as the properties of the resin composition are not deteriorated.

Next, an explanation will be given to a production process for the polylactic acid formed article according to the first inventive aspect.

The polylactic acid resin having an optical purity of not lower than 90% and a residual lactide amount of 0.1 to 0.6% by mass and the crystal nucleus agent and, as required, the dispersant are first mixed together, and the resulting mixture was melted to be formed into a sheet. The method for the preparation of the sheet is not particularly limited, but a T-die method, an inflation method or a calendar method, for example, may be employed for the preparation of the sheet. Particularly, the T-die method is preferred, in which a T-die is employed for melt-kneading and extrusion. Where the preparation is achieved by the T-die, an unstretched sheet having a thickness of about 150 to 500 µm is prepared, for example, by supplying the ingredients into a hopper of a uniaxial extruder or a biaxial extruder, heating the extruder at a cylinder temperature of 180 to 230° C. and at a T-die temperature of 200 to 230° C., melting and kneading the ingredients and extruding the resulting mixture into a sheet, and cooling the sheet on a cast roll adjusted at a temperature of 30 to 50° C. The thickness of the unstretched sheet is not particularly limited, but may properly be determined according to the application, the property requirements, the cost and the like.

The article is formed from the resulting sheet by a forming process. In order to impart the formed article with the aforesaid required thermal characteristics, it is necessary to employ the polylactic acid resin composition having the specified formulation, and to improve the crystallinity of the polylactic acid in the formed article by performing the heat treatment under specified conditions before the sheet forming or during the sheet forming.

More specifically, the temperature for the heat treatment should be set at a temperature of 110 to 150° C. at which the polylactic acid is practically most easily crystallized. If the heat treatment temperature is lower than 110° C., the polylactic acid is insufficiently crystallized. If the heat treatment temperature is higher than 150° C., the crystallization speed of the polylactic acid is extremely low. Further, crystals of the polylactic acid are melted thereby to result in insufficient crystallization, because the temperature is close to the melting point of the polylactic acid. Therefore, the heat treatment temperature is preferably in a range of 125 to 150° C., particularly preferably 125 to 145° C.

Further, the heat treatment period should be in a range of 1 to 30 seconds, which is practically applicable to the production cycle and just enough for the crystallization. A heat treatment period of shorter than 1 second is insufficient for the crystallization of the polylactic acid. A heat treatment period of longer than 30 seconds is not applicable to the practical production cycle, and is industrially disadvantageous. Therefore, the heat treatment period is preferably in a range of 3 to 30 seconds, particularly preferably 3 to 20 seconds.

The method for the forming of the sheet is not particularly limited, but one of vacuum forming, air pressure forming, vacuum air pressure forming and press forming is preferably employed for the forming.

In the production process for the polylactic acid formed article, the formed article which is excellent in heat resistance with thermal characteristics such that a difference between the absolute value of the crystal fusion heat amount ΔHm measured at a heat-up rate of 20° C./min by means of the differential scanning calorimeter and the absolute value of the heat-up crystallization heat amount ΔHc is not smaller than 25 J/g, the crystallinity determined by the X-ray measurement is not lower than 35%, and the crystallization speed at 130° C. is not lower than 0.05 min$^{-1}$ according to the first inventive aspect can industrially be produced in a practical production cycle.

Next, an explanation will be given to a production process for the polylactic acid formed article according to the second inventive aspect.

The polylactic resin (A) having an optical purity of not lower than 95%, the aromatic/aliphatic copolymer polyester or the aliphatic polyester (B) having a glass transition temperature of not higher than 0° C. and the talc (C) and, as required, the dispersant are blended in the specified ratio. In this case, all the components are preliminarily compounded in a biaxial extruder. Alternatively, only the components (A) and (C) may be compounded, and then dry-blended with the compound (B), or all the components may be dry-blended. Thereafter, the sheet is prepared by melting and kneading the resulting resin composition in a uniaxial extruder or a biaxial extruder having a T-die and extruding the resin composition through the T-die onto a cast roll adjusted at a temperature of 30 to 50° C. The thickness of the sheet may properly be selected according to the application. The thickness of the sheet is preferably 200 to 750 μm.

Thereafter, the unstretched sheet is heat-treated under the following conditions in a continuous or separate step, and then formed into the target article by any one of press forming, vacuum forming, air pressure forming and vacuum air pressure forming. Alternatively, the unstretched sheet may be formed into the article by any of the forming methods, while being heat-treated in a die.

In the present invention, the resin, the crystal nucleus agent and the like should precisely be optimized, and the heat treatment should be performed at a treatment temperature of 110 to 150° C. for a treatment period of 1 to 30 seconds. At a treatment temperature of 110 to 150° C., the polylactic acid is practically most easily crystallized. A treatment period of 1 to 30 seconds is practically applicable to the production cycle and just enough for the crystallization. If the treatment temperature is lower than 110° C., the polylactic acid is insufficiently crystallized. On the other hand, if the heat treatment temperature is higher than 150° C., the crystallization speed is extremely low, resulting in insufficient crystallization. A treatment period of shorter than 1 second is insufficient for the crystallization. A treatment period of longer than 30 seconds is not applicable to the practical production cycle, and is industrially disadvantageous.

EXAMPLES

Next, an explanation will be given to examples and comparative examples.

In the following examples and comparative examples, the characteristic properties are determined in the following manner.

(1) Crystal Fusion Heat Amount ΔHm and Heat-Up Crystallization Heat Amount ΔHc

When a 10 mg test sample of a formed article was heated up at a heat-up rate of 20° C./min with the use of Perkin Elmer's Pyris1 DSC, a total heat amount at a peak appearing on an exothermic side was determined as the heat-up crystallization heat amount ΔHc, and a total heat amount at a peak appearing on an endothermic side was determined as a crystal fusion heat amount ΔHm.

(2) Crystallinity Determined by X-Ray Measurement

The formed article to be subjected to measurement was powdered, and the measurement was performed by a WAXD reflection powder method with the use of an X-ray diffractometer (RAD-rB available from Rigaku Denki Kogyo). Then, an integrated intensity ratio was determined by a multi-peak separation method.

(3) Crystallization Speed

With the use of Perkin Elmer's Pyris1 DSC, a test sample was heated from 20° C. to 200° C. at 500° C./min, then kept at 200° C. for 5 minutes, and cooled to 130° C. at −500° C./min. Then, the measurement was continued until the completion of the crystallization. Thereafter, the crystallization speed was determined by multiplying an inversion of a period required until a crystallization ratio of 0.5 was reached by a crystallization ratio of 0.5.

(4) Heat Resistance

With the use of a single-shot indirect-heating vacuum forming machine and an aluminum die CT-DELICAN 15-11, a container having a length of 150 mm, a width of 110 mm and a depth of 20 mm was formed from a sheet. Then, 90° C. hot water was poured in the container and, after 5 minutes, the container was visually observed to check for deformation thereof. Where no deformation was observed, the container was regarded to have an excellent heat resistance and indicated by ○ in evaluation. Where slight deformation was observed, the container was regarded to have a slightly lower heat resistance and indicated by Δ in evaluation. Where remarkable deformation was observed, the container was regarded to have an insufficient heat resistance and indicated by x in evaluation.

(5) Molecular Weight Retention Ratio

The weight-average molecular weight (Mw) of polylactic acid after a test sample was allowed to stand in a constant-temperature constant-humidity chamber under 50° C./90% RH conditions for 30 days was determined by passing a THF solution containing the polylactic acid through a Styragel HR column and an Ultrastyragel column with the use of polystyrene as a reference substance by means of a refractometer as a detector. The retention ratio was calculated from the following expression:

Mw retention ratio (%)=(Mw after 30-day test/Mw before test)×100

The molecular weight retention ratio is regarded as the index of hydrolysis. It is supposed that the extent of the hydrolysis is increased as the molecular weight retention ratio decreases.

(6) Shock Resistance

A box-shaped article formed from a 500 μm thick sheet and subjected to the heat treatment was horizontally placed with its bottom upward, and a 300 g iron ball was dropped onto the article from different heights in increments of 5 cm. The shock resistance was evaluated by a falling ball height defined as [(a height at which the article was broken at a 50% probability)−5] cm.

Example 1

First, 84% by mass of polylactic acid (NATURE WORKS available from Cargill Dow) having an optical purity of 97.6%, a residual lactide amount of 0.2% by mass and a weight-average molecular weight of 200,000, 15% by mass of talc as a crystal nucleus agent (MW HS-T available from Hayashi Kasei) having an average particle diameter of 2.75 μm and 1% by mass of erucamide (ALFLOW P10 available from Nihon yushi) as a dispersant were melt-kneaded by means of a biaxial kneader/extruder (MODEL TEX44α available from Nihon Seikosho) to prepare a polylactic acid compound material at an extrusion temperature of 230° C. With the use of a uniaxial extruder having a 1000-mm wide T-die and a screw having a diameter of 90 mm, the polylactic acid compound material was melt-extruded at an extrusion temperature of 215° C. to provide a 350 μm thick unstretched sheet in intimate contact with a cast roll set at 40° C. With the use of a single-shot indirect-heating vacuum forming machine and an aluminum die (CT DELICAN 15-11), a container (formed article) having a length of 150 mm, a width of 110 mm and a depth of 20 mm was formed from the sheet by vacuum forming. A heat treatment was performed at a die inside temperature of 140° C. for 5 seconds during the vacuum forming.

The properties of the resulting formed article and the like are shown in Table 1.

| | | Example 1 | Example 2 | Example 3 | Example 4 | Example 5 | Example 6 | Example 7 |
|---|---|---|---|---|---|---|---|---|
| Polylactic Acid | Optical purity (%) | 97.6 | 92.0 | 97.8 | 97.6 | 97.6 | 97.6 | 97.6 |
| | Residual lactide (mass %) | 0.2 | 0.2 | 0.4 | 0.2 | 0.2 | 0.2 | 0.2 |
| Talc | Content (mass %) | 15 | 15 | 15 | 1 | 15 | 15 | 15 |
| | Average particle diameter (μm) | 2.75 | 2.75 | 2.75 | 2.75 | 2.75 | 2.75 | 2.75 |
| Heat treatment temperature (° C.) | | 140 | 125 | 140 | 140 | 145 | 130 | 140 |
| Heat treatment period (sec) | | 5 | 15 | 5 | 5 | 3 | 20 | 7 |
| \|ΔHm\| − \|ΔHc\| | | 33.7 | 31.7 | 36.0 | 26.0 | 29.5 | 27.0 | 34.0 |
| Crystallinity (%) | | 42 | 40 | 43 | 35 | 38 | 36 | 43 |
| Crystallization speed (min$^{-1}$) | | 0.085 | 0.055 | 0.095 | 0.100 | 0.085 | 0.085 | 0.085 |
| Heat resistance | | ◯ | ◯ | ◯ | ◯ | ◯ | ◯ | ◯ |
| Molecular weight retention ratio (%) | | 82 | 80 | 85 | 85 | 78 | 75 | 82 |

| | | Comparative Example 1 | Comparative Example 2 | Comparative Example 3 | Comparative Example 4 | Comparative Example 5 |
|---|---|---|---|---|---|---|
| Polylactic acid | Optical purity (%) | 97.6 | 97.6 | 80.0 | 97.6 | 97.6 |
| | Residual lactide (mass %) | 0.2 | 0.2 | 0.2 | 1.0 | 0.2 |
| Talc | Content (mass %) | 0 | 40 | 15 | 15 | 15 |
| | Average particle diameter (μm) | — | 2.75 | 2.75 | 2.75 | 2.75 |
| Heat treatment temperature (° C.) | | 140 | 140 | 140 | 140 | 110 |
| Heat treatment period (sec) | | 5 | 5 | 5 | 5 | 60 |
| \|ΔHm\| − \|ΔHc\| | | 8.2 | 21.3 | 0 | 35.5 | 11.2 |
| Crystallinity (%) | | 4 | 29 | 0 | 43 | 15 |
| Crystallization speed (min$^{-1}$) | | 0.005 | 0.040 | 0 | 0.100 | 0.085 |
| Heat resistance | | X | Δ | X | ◯ | X |
| Molecular weight retention ratio (%) | | 35 | 80 | 25 | 10 | 35 |

Example 2

An unstretched sheet was prepared and a container (formed article) was formed from the sheet in substantially the same manner as in Example 1, except that polylactic acid (NATURE WORKS available from Cargill Dow) having an optical purity of 92.0%, a residual lactide amount of 0.2% by mass and a weight-average molecular weight of 190,000 was employed. The heat treatment was performed at a die inside temperature of 125° C. for 15 seconds during the vacuum forming.

The properties of the resulting formed article and the like are shown in Table 1.

Example 3

A container (formed article) was produced in substantially the same manner as in Example 1, except that polylactic acid (NATURE WORKS available from Cargill Dow) having an optical purity of 97.8%, a residual lactide amount of 0.4% by mass and a weight-average molecular weight of 200,000 was employed.

The properties of the resulting formed article and the like are shown in Table 1.

Example 4

A container (formed article) was produced in substantially the same manner as in Example 1, except that the content of the talc as the crystal nucleus agent was 1% by mass.

The properties of the resulting formed article and the like are shown in Table 1.

Examples 5 and 6

Containers (formed articles) were produced in substantially the same manner as in Example 1, except that the die inside temperature and the heat treatment period for the heat treatment performed simultaneously with the vacuum forming were as shown in Table 1.

The properties of the resulting formed articles and the like are shown in Table 1.

Example 7

A container (formed article) was produced in substantially the same manner as in Example 1, except that the unstretched sheet was preliminarily heat-treated at 140° C. for 7 seconds and the vacuum forming was performed at a die inside temperature of 125° C. for a treatment period of 1 second after the heat treatment.

The properties of the resulting formed article and the like are shown in Table 1.

The containers (formed articles) of Examples 1 to 6 were each produced by preparing a sheet of a resin composition containing polylactic acid having a D-lactic acid content and a residual lactide amount within the ranges specified by the present invention and the crystal nucleus agent in a proportion within the range specified by the present invention, and heat-treating the sheet at a temperature for a period within the ranges specified by the present invention simultaneously with the forming of the sheet. Therefore, the formed articles each had a high crystallinity, and were excellent in heat resistance. The container (formed article) of Example 7 was produced by performing the vacuum forming after the heat treatment of the sheet at a temperature for a period within the ranges specified by the present invention rather than simultaneously with the heat treatment. Therefore, the formed article had a high crystallinity, and was excellent in heat resistance.

Comparative Example 1

A container (formed article) was produced in substantially the same manner as in Example 1, except that the talc was not added as the crystal nucleus agent.

The properties of the resulting container and the like are shown in Table 1.

Comparative Example 2

A container (formed article) was produced in substantially the same manner as in Example 1, except that the talc was added as the crystal nucleus agent in an amount of 40% by mass which was greater than the range specified by the present invention.

The properties of the resulting container and the like are shown in Table 1.

Comparative Example 3

A container (formed article) was produced in substantially the same manner as in Example 1, except that polylactic acid (NATURE WORKS available from Cargill Dow) having an optical purity of 80.0% which was lower than the range specified by the present invention, a residual lactide amount of 0.2% by mass and a weight-average molecular weight of 200,000 was employed.

The properties of the resulting container and the like are shown in Table 1.

Comparative Example 4

A container (formed article) was produced in substantially the same manner as in Example 1, except that polylactic acid (NATURE WORKS available from Cargill Dow) having an optical purity of 97.6%, a residual lactide amount of 1.0% by mass which was greater than the range specified by the present invention and a weight-average molecular weight of 200,000 was employed.

The properties of the resulting container and the like are shown in Table 1.

Comparative Example 5

A container (formed article) was produced in substantially the same manner as in Example 1, except that the heat treatment temperature was 110° C. which was lower than the range specified by the present invention and the heat treatment period was 60 seconds which was longer than the range specified by the present invention.

The properties of the resulting container and the like are shown in Table 1.

In Comparative Example 1, the crystal nucleus agent was not added to the resin composition for the sheet and, hence, it was impossible to accelerate the crystallization speed, resulting in a lower productivity. Further, the crystallization was insufficient. Therefore, when hot water was poured in the resulting container, the container was deformed in an instance with a poor heat resistance.

In Comparative Example 2, the crystal nucleus agent was added in an excessively great amount, so that the prepared sheet was embrittled. Therefore, the sheet was easily cracked during the forming, and cracks were observed in the resulting container. Further, the container did not have a heat resistance sufficient for practical use.

In Comparative Example 3, the optical purity of the polylactic acid was lower than the range specified by the present invention, so that the polylactic acid had a reduced crystallinity. Even though the crystal nucleus agent was added and the heat treatment conditions were properly adjusted, it was impossible to promote the crystallization of the polylactic acid. It was possible to produce the formed article, but the article was stuck to the die, resulting in a reduced productivity. Further, the crystallinity was insufficient, so that the container was poor in heat resistance.

In Comparative Example 4, the residual lactide amount of the polylactic acid was greater than the range specified by the present invention. Even though the crystallization was promoted, hydrolysis and thermal decomposition were also promoted by lactide as apparent from a lower molecular weight retention ratio. Therefore, the formed article was very brittle, and problematic in practical use.

In Comparative Example 5, the heat treatment temperature was lower than the range specified by the present invention. Even though the heat treatment period was longer than the range specified by the present invention, the crystallization was insufficient and the heat resistance was poorer.

Example 8

Crystalline polylactic acid (A) (NATURE WORKS available from Cargill Dow, and having an optical purity of 97.2%, a residual lactide amount of 0.2% by mass and a weight-average molecular weight of 200,000) and an aromatic/aliphatic copolymer polyester (B) (ECOFLEX F available from BASF and having a glass transition temperature of −30° C.) having a glass transition temperature of not higher than 0° C. were blended in a ratio of (A)/(B)=90/10% by mass, and then talc (MW HS-T available from Hayashi Kasei) having an average particle diameter of 2.75 μm was added to the resulting blend in an amount of 10% by mass based on the total amount of the composition. The resulting blend was melt-kneaded by means of a biaxial kneader/extruder (MODEL TEX44α available from Nihon Seikosho) to prepare a polylactic acid compound material at an extrusion temperature of 230° C.

With the use of a uniaxial extruder having a 1000 mm wide T-die and a screw having a diameter of 90 mm, the polylactic acid compound material was melt-extruded at an extrusion temperature of 215° C. to provide an unstretched sheet having a thickness of 500 μm on a cast roll set at 40° C.

With the use of a single-shot indirect-heating vacuum forming machine and an aluminum die CT DELICAN 15-11, a container (formed article) having a length of 150 mm, a width of 110 mm and a depth of 20 mm was formed from the sheet by vacuum forming. In the vacuum forming, a heat treatment was performed at a die inside temperature of 140° C. for a retention period of 5 seconds.

The properties of the resulting formed article are shown in Table 2.

TABLE 2

| | | Example | | | | | | | | |
|---|---|---|---|---|---|---|---|---|---|---|
| | | 8 | 9 | 10 | 11 | 12 | 13 | 14 | 15 | 16 |
| Polylactic acid (A) | Optical purity (%) | 97.2 | 96.0 | 97.2 | 97.2 | 97.2 | 97.2 | 97.2 | 97.2 | 97.2 |
| | Residual lactide amount (mass %) | 0.2 | 0.4 | 0.2 | 0.2 | 0.2 | 0.2 | 0.2 | 0.2 | 0.2 |
| B1 or B2 (B) | Type | B1 | B1 | B1 | B1 | B1 | B2 | B1 | B1 | B1 |
| | Glass transition temperature (° C.) | −30 | −30 | −30 | −30 | −30 | −30 | −30 | −30 | −30 |
| (A)/(B) (mass %) | | 90/10 | 90/10 | 85/15 | 90/10 | 90/10 | 90/10 | 90/10 | 95/5 | 90/10 |
| Talc (C) | Content (mass %) | 10 | 10 | 10 | 15 | 10 | 10 | 10 | 10 | 10 |
| | Average particle diameter (μm) | 2.75 | 2.75 | 2.75 | 2.75 | 4.1 | 2.75 | 2.75 | 2.75 | 2.75 |
| Heat treatment | Temperature (° C.) | 140 | 120 | 140 | 140 | 140 | 140 | 150 | 130 | 140 |
| | Period (sec) | 5 | 15 | 5 | 5 | 5 | 5 | 3 | 20 | 10 |
| |ΔHm| − |ΔHc| (J/g) | | 31.5 | 29.0 | 29.0 | 33.5 | 30.0 | 31.7 | 27.2 | 29.5 | 29.5 |
| Crystallization speed (min⁻¹) | | 0.018 | 0.016 | 0.015 | 0.033 | 0.017 | 0.020 | 0.018 | 0.030 | 0.018 |
| Heat resistance | | ○ | ○ | ○ | ○ | ○ | ○ | ○ | ○ | ○ |
| Molecular weight retention ratio (%) | | 80 | 75 | 78 | 82 | 78 | 80 | 70 | 78 | 82 |
| Falling ball height (cm) | | 50 | 50 | 90 | 50 | 50 | 50 | 50 | 30 | 50 |

| | | Comparative Example | | | | | | |
|---|---|---|---|---|---|---|---|---|
| | | 6 | 7 | 8 | 9 | 10 | 11 | 12 |
| Polylactic acid (A) | Optical purity (%) | 97.2 | 97.2 | 80.0 | 97.2 | 97.2 | 97.2 | 97.2 |
| | Residual lactide amount (mass %) | 0.2 | 0.2 | 0.5 | 0.2 | 0.2 | 0.2 | 0.2 |
| B1 or B2 (B) | Type | B1 | B1 | B1 | None | B1 | B1 | B1 |
| | Glass transition temperature (° C.) | −30 | −30 | −30 | | −30 | −30 | −30 |
| (A)/(B) (mass %) | | 90/10 | 90/10 | 90/10 | 100/0 | 70/30 | 90/10 | 90/10 |
| Talc (C) | Content (mass %) | 0 | 40 | 10 | 10 | 10 | 10 | 10 |
| | Average particle diameter (μm) | — | 2.75 | 2.75 | 2.75 | 2.75 | 2.75 | 2.75 |
| Heat treatment | Temperature (° C.) | 140 | 140 | 140 | 140 | 140 | 160 | 100 |
| | Period (sec) | 5 | 5 | 5 | 5 | 5 | 5 | 60 |
| |ΔHm| − |ΔHc| (J/g) | | 6.5 | 19.8 | 0 | 32.0 | 16.5 | 10.0 | 9.0 |
| Crystallization speed (min⁻¹) | | 0.001 | 0.035 | 0 | 0.070 | 0.006 | 0.018 | 0.018 |
| Heat resistance | | x | x | x | ○ | x | x | x |

TABLE 2-continued

| Molecular weight retention ratio (%) | 30 | 50 | 25 | 80 | 40 | 15 | 15 |
|---|---|---|---|---|---|---|---|
| Falling ball height (cm) | 95 | 10 | 25 | 5 | ≧100 | 90 | 90 |

B1: Aromatic/aliphatic copolymer polyester
B2: Aliphatic polyester

Example 9

An unstretched sheet was prepared and a container (formed article) was formed from the sheet by vacuum forming in substantially the same manner as in Example 8, except that polylactic acid (NATURE WORKS available from Cargill Dow, and having an optical purity of 96.0%, a residual lactide amount of 0.4% by mass and a weight-average molecular weight of 190,000) was employed as the crystalline polylactic acid (A). In the vacuum forming, a heat treatment was performed at a die inside temperature of 120° C. for a retention period of 15 seconds.

The properties of the resulting formed article are shown in Table 2.

Example 10

An unstretched sheet was prepared and a container (formed article) was formed from the sheet by vacuum forming in substantially the same manner as in Example 8, except that the ratio between the crystalline polylactic acid (A) and the aromatic/aliphatic copolymer polyester (B) having a glass transition temperature of not higher than 0° C. was (A)/(B)= 85/15% by mass.

The properties of the resulting formed article are shown in Table 2.

Example 11

An unstretched sheet was prepared and a container (formed article) was formed from the sheet by vacuum forming in substantially the same manner as in Example 8, except that the talc (C) was added in an amount of 15% by mass based on the total amount of the composition.

The properties of the resulting formed article are shown in Table 2.

Example 12

An unstretched sheet was prepared and a container (formed article) was formed from the sheet by vacuum forming in substantially the same manner as in Example 8, except that talc (C) (MICRON WHITE #5000A available from Hayashi Kasei) having an average particle diameter of 4.1 μm was employed.

The properties of the resulting formed article are shown in Table 2.

Example 13

An unstretched sheet was prepared and a container (formed article) was formed from the sheet by vacuum forming in substantially the same manner as in Example 8, except that an aliphatic polyester (B) (BIONOLE 3001 available from Showa Polymer and having a glass transition temperature of −30° C.) having a glass transition temperature of not higher than 0° C. was employed.

The properties of the resulting formed article are shown in Table 2.

Example 14

An unstretched sheet was prepared and a container (formed article) was formed from the sheet by vacuum forming in substantially the same manner as in Example 8, except that the conditions for the heat treatment in the die were changed to a temperature of 150° C. and a retention period of 3 seconds as shown in Table 2.

The properties of the resulting formed article are shown in Table 2.

Example 15

An unstretched sheet was prepared and a container (formed article) was formed from the sheet by vacuum forming in substantially the same manner as in Example 8, except that the ratio between the crystalline polylactic acid (A) and the aromatic/aliphatic copolymer polyester (B) having a glass transition temperature of not higher than 0° C. was (A)/(B)= 95/5% by mass and the conditions for the heat treatment in the die were changed to a temperature of 130° C. and a retention period of 20 seconds as shown in Table 2.

The properties of the resulting formed article are shown in Table 2.

Example 16

An unstretched sheet prepared in the same manner as in Example 8 was subjected to a heat treatment at 140° C. for 10 seconds. Thereafter, a container (formed article) having a length of 150 mm, a width of 110 mm and a depth of 20 mm was formed from the sheet by vacuum forming with the use of a single-shot indirect-heating vacuum forming machine and an aluminum die CT DELICAN 15-11. In the vacuum forming, the die inside temperature was 125° C. and the forming cycle was 1 second.

The properties of the resulting formed article are shown in Table 2.

Comparative Example 6

An unstretched sheet was prepared and a container (formed article) was formed from the sheet by vacuum forming in substantially the same manner as in Example 8, except that the talc was not employed.

The properties of the resulting formed article are shown in Table 2.

Comparative Example 7

An unstretched sheet was prepared and a container (formed article) was formed from the sheet by vacuum forming in substantially the same manner as in Example 8, except that the content of the talc was 40% by mass.

The properties of the resulting formed article are shown in Table 2.

Comparative Example 8

An unstretched sheet was prepared and a container (formed article) was formed from the sheet by vacuum forming in substantially the same manner as in Example 8, except that polylactic acid (NATURE WORKS available from Cargill Dow, and having an optical purity of 80.0%, a residual lactide amount of 0.5% by mass and a weight-average molecular weight of 200,000) was employed as the polylactic acid (A).

The properties of the resulting formed article are shown in Table 2.

Comparative Example 9

An unstretched sheet was prepared and a container (formed article) was formed from the sheet by vacuum forming in substantially the same manner as in Example 8, except that the polyester (B) having a glass transition temperature of not higher than 0° C. was not employed but only crystalline polylactic acid (A) and talc (C) as employed in Example 8 were employed.

The properties of the resulting formed article are shown in Table 2.

Comparative Example 10

An unstretched sheet was prepared and a container (formed article) was formed from the sheet by vacuum forming in substantially the same manner as in Example 8, except that the blend ratio between the crystalline polylactic acid (A) and the aromatic/aliphatic copolymer polyester (B) having a glass transition temperature of not higher than 0° C. was (A)/(B)=70/30% by mass.

The properties of the resulting formed article are shown in Table 2.

Comparative Example 11

An unstretched sheet was prepared in the same manner as in Example 8, and a container (formed article) was formed from the sheet in substantially the same manner as in Example 8 by means of a forming machine as employed in Example 8, except that the heat treatment conditions were changed to perform the heat treatment in a die at 160° C. for 5 seconds.

The properties of the resulting formed article are shown in Table 2.

Comparative Example 12

An unstretched sheet was prepared in the same manner as in Example 8, and a container (formed article) was formed from the sheet in substantially the same manner as in Example 8 by means of a forming machine as employed in Example 8, except that the heat treatment conditions were changed to perform the heat treatment in a die at 100° C. for 1 minute.

The properties of the resulting formed article are shown in Table 2.

The containers (formed articles) produced in Examples 8 to 15 were free from deformation even when hot water was poured therein, and were excellent in heat resistance. Further, the containers were excellent in shock resistance.

In Example 16, the sheet was prepared by employing the resin composition which contained the polylactic acid having an optical purity within the range specified by the present invention and contained the aromatic/aliphatic copolymer polyester having a glass transition temperature of not higher than 0° C. and the talc in a blend ratio within the range specified by the present invention. After the sheet was subjected to the heat treatment at a temperature for a period within the ranges specified by the present invention, the article was formed from the sheet. Therefore, the resulting formed article had a high crystallinity, and was excellent in heat resistance.

In Comparative Example 6, the talc was not employed, so that the crystallization of the heat-treated container was insufficient. Therefore, the container was deformed in an instance when hot water was poured in the container.

In Comparative Example 7, an excessively great amount of the talc was added, so that the container per se was embrittled. Therefore, cracks were observed in the container during the forming or after the forming.

In Comparative Example 8, the polylactic acid had a lower optical purity. Even through the crystallization was promoted by the heat treatment and the addition of the crystal nucleus agent, the crystallization of the polylactic acid was insufficient and the container was poorer in heat resistance.

In Comparative Example 9, the polyester (B) having a glass transition temperature of not higher than 0° C. was not employed as in Examples 1 to 7. Therefore, the falling ball height was smaller, so that the shock resistance was insufficient as compared with Examples 8 to 16.

In Comparative Example 10, the polyester (B) having a glass transition temperature of not higher than 0° C. was blended in an excessively great amount. Though the shock resistance was excellent, the crystallization speed was extremely low, resulting in a prolonged forming cycle. This is disadvantageous from the viewpoint of industrial production.

In Comparative Example 11, the heat treatment temperature in the die was 160° C., which was high and close to the melting point of the polylactic acid, so that crystal nuclei were fused. Therefore, the resulting container was not sufficiently crystallized and, hence, was poorer in heat resistance.

In Comparative Example 12, the heat treatment temperature in the die was 100° C., which was not high enough for the crystallization of molecules of the polylactic acid. Even though the treatment period was prolonged, the crystallization was insufficient. Therefore, the container was poorer in heat resistance with $|\Delta Hm|-|\Delta Hc|=9.0$ J/g.

The invention claimed is:

1. A production process for a polylactic acid article formed from a sheet of a resin composition comprising polylactic acid as a major resin component, the production process comprising the steps of:

extruding the resin composition into an unstretched sheet, the resin composition comprising a crystalline polylactic acid resin (A) having an optical purity of not lower than 95%, an aromatic/aliphatic copolymer polyester (B) having a glass transition temperature of not higher than 0° C., and talc (C) having an average particle diameter of 1 to 8 μm with an (A)/(B) blend ratio of (A)/(B)=97/3 to 85/15% by mass and with a (C) blend ratio of 1 to 30% by mass based on the total amount of the composition;

forming the unstretched sheet into the article in a die by one of vacuum forming, air pressure forming, vacuum air pressure forming, or press forming while heat-treating the sheet in the die at a treatment temperature of 110 to 150° C. for a treatment period of 1 to 30 seconds;

thereby obtaining a polylactic acid article having a crystallization index such that a difference between an absolute value of a crystal fusion heat amount ΔHm as measured at a heat-up rate of 20° C./min by means of a differential scanning colorimeter and an absolute value of a heat-up crystallization heat amount ΔHc is $(|\Delta Hm|-|\Delta Hc|) \geq 25$ J/g, a crystallization speed of 0.015-0.033 $min^{-1}$ at 130° C., and a falling ball impact resistance such that a falling ball height is 30-90 cm with respect to a thickness of 500 μm.

* * * * *